Feb. 6, 1968
A. E. SCHOFIELD ET AL 3,368,135
OVERVOLTAGE PROTECTION CIRCUIT FOR
CONDENSER DISCHARGE SYSTEM
Filed Dec. 30, 1964
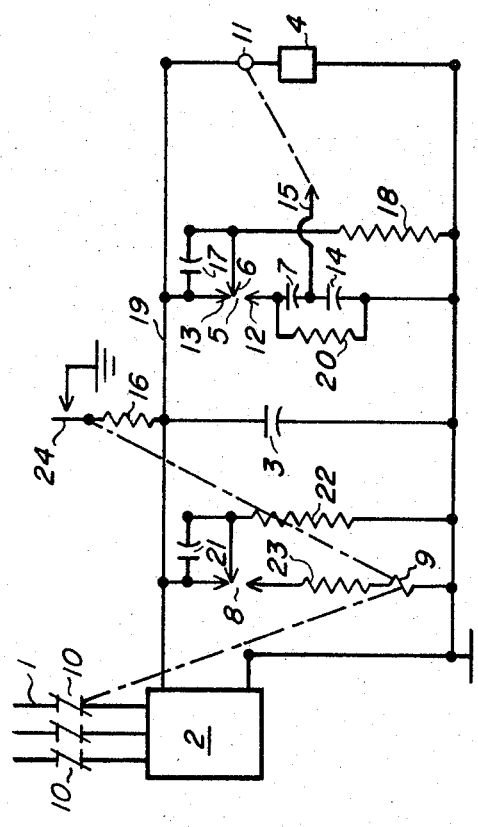
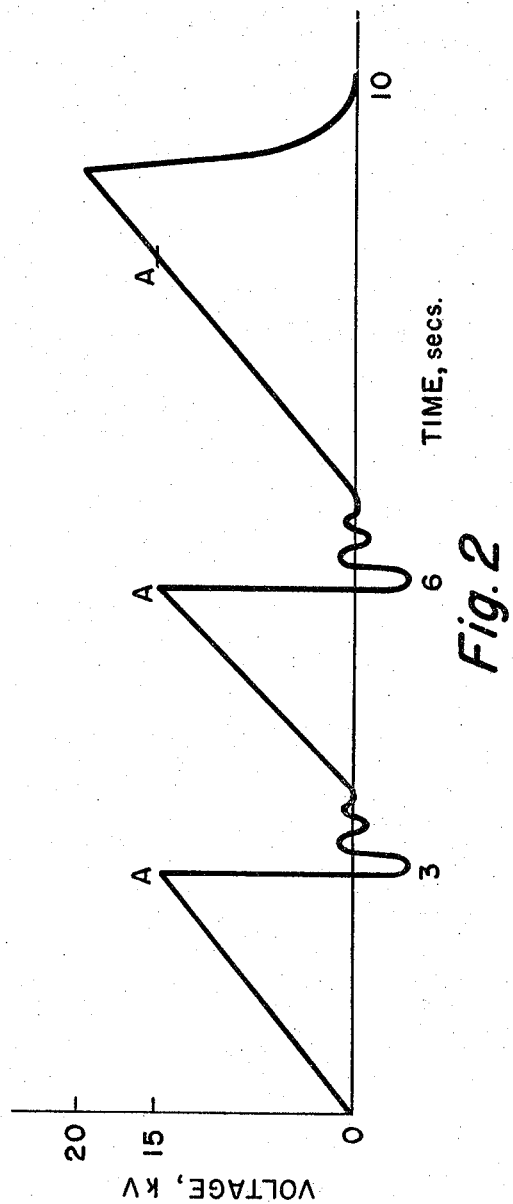
INVENTOR.
Aldred E. Schofield
Robert O. Holm
BY 3,368,135
OVERVOLTAGE PROTECTION CIRCUIT FOR
CONDENSER DISCHARGE SYSTEM
Aldred E. Schofield and Robert O. Holm, Los Alamos, N. Mex., assignors to the United States of America as represented by the United States Atomic Energy Commission
Filed Dec. 30, 1964, Ser. No. 422,469
2 Claims. (Cl. 320—1)

ABSTRACT OF THE DISCLOSURE

A condenser discharge system employing an overvoltage safety circuit wherein a capacitor is discharged through a load or the overvoltage safety circuit by the action of a spark gap which employs a third electrode, a resistor and capacitor in such a manner that the third electrode continually arcs in the spark gap and the gap is always ionized.

---

This invention relates to condenser discharge systems and, more particularly, to those systems in which electrical energy is stored in a condenser and then discharged into a load circuit in order to deliver a pulse of current to the load.

In such systems a condenser or a bank of condensers is charged to a predetermined voltage. The capacitor or capacitors are then automatically discharged into a load. It is desirable, as a safety measure, to provide an overvoltage safety device so that if the condensers fail to automatically discharge at the predetermined voltage, the safety device may discharge the capacitors before a very large charge can be built up which would damage the electrical components.

Previously, meter relays were utilized to perform both the triggering and overvoltage safety functions. When utilized in the triggering system, these meter relays were disadvantageous in that they only permitted very slow repetition rates (of automatic charge and discharge). When utilized in the overvoltage safety circuit the meter relays have the further disadvantage that long cables were required between resistor and relays which often gave rise to current surges harmful to the relays.

The present invention is a charging circuit comprising a power input line, a first switch in said power input line, power supply means, said power input line feeding current to said power supply means, a charging line comprising the output of said power supply means, a capacitor, said charging line being connected to a capacitor, a second switch, a load, said second switch being between said charging line and said load, a first spark gap in parallel with said capacitor, said first spark gap being set to fire at a preselected voltage, the ground side of said first spark gap being electrically connected to said second switch, a second spark gap, said second spark gap being set to fire at a higher voltage than said first spark gap, said second spark gap being in parallel with said capacitor, a relay actuating coil in series with said second spark gap on the ground side thereof, said relay actuating coil actuating two relays, one of said relays opening the said first switch in the power input line, thereby shutting off the charging current, a third switch connecting the charging line to ground, the other of said relays closing said third switch thereby discharging the circuit to ground.

This device has several advantages not possessed by prior art devices. First, it is capable of a very rapid repetition rate and is less subject to failure. This extreme reliability comes about in part through the fact that the spark gaps separate the charged portion of the circuit from the rest of the electrical components.

Accordingly, it is an object of this invention to secure a substantially complete transfer of energy from a charged capacitor to a load when a predetermined voltage has been reached.

Another object is to devise a capacitor discharge system of extreme reliability and accuracy.

A further object of this invention is to provide a capacitor discharge system wherein no current is applied to certain components except during discharge.

An additional object of this invention is to provide a capacitor discharge system with an exceedingly rapid "repetition" (time required to charge and discharge) rate.

A still further object is to provide a capacitor discharge system in which long cables—which give rise to current surges—between resistors and relays are eliminated.

Another object of this invention is to provide a capacitor discharge system which incorporates a safety discharge if the trigger fails to operate at the predetermined voltage.

The above and other objects and features of the invention will be made fully apparent to those skilled in the art from a consideration of the following detailed description taken in conjunction with the accompanying drawings wherein:

FIGURE 1 is a schematic diagram of a condenser discharge system embodying the invention.

FIGURE 2 is a set of curves illustrating the mode of operation of the invention.

In the arrangement illustrated in FIGURE 1, current (e.g., 480 volt, 3 phase) is supplied through line 1 to constant current power supply 2. In the particular embodiment described, constant current power supply 2 supplies 750 milliampere, 25 kilovolt current in order to charge capacitor 3. When charged, capacitor 3 is used to drive load 4. Capacitor 3 may, of course, be a bank of capacitors arranged in parallel but for the particular embodiment consists of one 14.2 $\mu$f., 20 kilovolt capacitor. Load 4 may be, for example, a linear pinch discharge. Since load 4 should be fired at a constant voltage, spark gap 5 is provided. Electrode 12 is set at the proper distance from electrode 13 to arc at the predetermined voltage (e.g., 15 kv.). When the gap breaks down, the voltage between capacitors 7 and 14 is conveyed by conductor 15 and impressed on the trigger electrode of trigger switch 11. Trigger switch 11 may be, for example, an ignitron or thyratron. Capacitors 7 and 14 may be selected to divide the impressed voltage to a value sufficient to actuate trigger 11 without harming it. In the specific example capacitors 7 and 14 have the values of 0.06 $\mu$f. and 0.12 $\mu$f., respectively, so that the voltage is compatible with the operating characteristics of the Size A ignitron 11 (which may for example be G.E. type #7703). Resistor 20 serves to discharge capacitors 7 and 14 after a main discharge operation and, in the specific embodiment, is a tapped 100,000 ohm, 200 watt resistor.

After trigger 11 connects load 4 into the circuit, capacitor bank 3 discharges into the load. If a constant current power supply is not used, a limiter (e.g., a resistor) should be interposed between the power supply and the capacitor in order to protect the power supply 2.

Since the system is capable of a very fast "rep" rate, it is desirable that the spark gap 5 be irradiated continually. Irradiation of a fairly high frequency permits discharge of the spark gap at a consistent voltage since some ionization occurs in the gap substantially continuously. The specific embodiment illustrates a resistance-capacitance circuit with an irradiating electrode, although it should be understood that other means of irradiating are suitable (e.g., irradiation by radioactive materials).

In FIGURE 1 an irradiating electrode 6 is et at a very close distance from charged electrode 13. For example, the distance between electrodes 6 and 13 may be about 0.004 inch compared to about ¾ inch between electrodes 12 and 13 in this specific embodiment. A very small capacitor 17 and a sizable resistor (500 μμf. and 5 megohms, respectively) are placed as shown between the ground and spark gap 5. The rate of occurrence of irradiation and hence generation of the triggering potential can be controlled by the size of the capacitor, resistor, and the space between electrodes 6 and 13. Capacitor 17 serves to prevent a continuous arc and resistor 18 to limit the current drawn off charged line 19 and capacitor 3.

The mode of operation of this capacitor discharge system is illustrated in FIGURE 2. As shown, the charge builds up to a predetermined value A (e.g., 15 kv.) at which time spark gap 5 causes discharge. This cycle is repeated rapidly (e.g., 3 sec.). The damped oscillations shown after discharge are greatly magnified along the time scale for purposes of illustration. In the particular embodiment described herein the time of charge is about 3 seconds whereas the time of oscillation is about $10^{-3}$ seconds. It should also be understood that although a "rep" rate of 3 seconds has been specified, this rate is determined only by the power supply charging rate and the deionization time of the spark gap. Furthermore, the device can be used as a single shot device. In the unlikely event that spark gap 5 or other electrical failure permits charge buildup beyond the predetermined voltage, it is advisable to include an overvoltage safety circuit in the system. Operation of this safety circuit is illustrated in the third cycle of FIG. 2 wherein a hypothetical failure permits charge buildup beyond 15 kv. At a higher predetermined value (e.g., 20 kv.) the safety circuit turns off the charging input and switches line 19 to ground.

The overvoltage safety circuit is actuated by spark gap 8. Spark gap 8 may be irradiated in the same manner as spark gap 5. In the specific embodiment capacitor 21 and resistor 22 are 500 μμf. and 50 megohms, respectively. Resistor 23, which protects relay actuating coil 9 is a 200,000 ohm, 200 watt resistor. When relay 9 is actuated by firing of spark gap 8, two functions are performed. Normally closed (during operation) switches 10 are opened thereby shutting off the charging current. In addition, relay 9 closes normally open (during operation) switch 24, thereby discharging capacitor 3 and shunting line 19 to ground through limiting resistor 16 (e.g., 30,000 ohms).

While specific details of a preferred embodiment of this invention have been described in the foregoing it will, of course, be understood that the invention is not limited to such details. Various modifications may be made by those skilled in the art from a consideration of the embodiment shown and the teachings hereof.

What is claimed is:
1. A charging circuit comprising charging means, a first switch in said charging means, a charging line, a capacitor, said capacitor being between said charging line and ground, a second switch, a load, said second switch being between said charging line and said load, a first spark gap in parallel with said capacitor, said first spark gap being set to fire at a preselected voltage, the ground side of said first spark gap being electrically connected to said second switch, a second spark gap, said second spark gap being set to fire at a higher voltage than said first spark gap, said second spark gap being in parallel with said capacitor, said second spark gap being in series with relay means, said relay means opening the said first switch in the charging means, means to continually irradiate at least one of said spark gaps, said means to irradiate including an irradiating electrode, a capacitor placed between the charged portion of the spark gap and the irradiating electrode and a resistor placed between the irradiating electrode and ground.

2. A charging circuit comprising a power input line, a first switch in said power input line, power supply means, said power input line feeding current to said power supply means, a charging line comprising the output of said power supply means, a capacitor, said charging line being connected to said capacitor, a second switch, a load, said second switch being between said charging line and said load, a first spark gap in parallel with said capacitor, said first spark gap being set to fire at a preselected voltage, the ground side of said first spark gap being electrically connected to said second switch, a second spark gap, said second spark gap being set to fire at a higher voltage than said first spark gap, said second spark gap being in parallel with said capacitor, a relay actuating coil in series with said second spark gap on the ground side thereof, said relay actuating coil actuating two relays, one of said relays opening the said first switch in the power input line, thereby shutting off the charging current, a third switch connecting the charging line to ground, the other of said relays closing said third switch thereby discharging the circuit to ground, and means to continually irradiate at least one of said spark gaps, said means to irradiate including an irradiating electrode, a capacitor placed between the charged portion of the spark gap and the irradiating electrode and a resistor placed between the irradiating electrode and ground.

References Cited

UNITED STATES PATENTS

| | | | |
|---|---|---|---|
| 2,569,133 | 9/1951 | Podolsky | 317—12.1 |
| 2,837,698 | 6/1958 | Segall | 320—1 |
| 2,840,766 | 6/1958 | Wouk | 323—4 X |
| 3,094,647 | 6/1963 | Ferrin | 317—31 |
| 3,124,738 | 3/1964 | Smith et al. | 317—31 |
| 3,273,018 | 9/1966 | Goldberg | 317—11 X |

BERNARD KONICK, *Primary Examiner.*

J. F. BREIMAYER, *Assistant Examiner.*